(No Model.)
W. J. KERR.
Muzzle for Animals.
No. 242,330. Patented May 31, 1881.
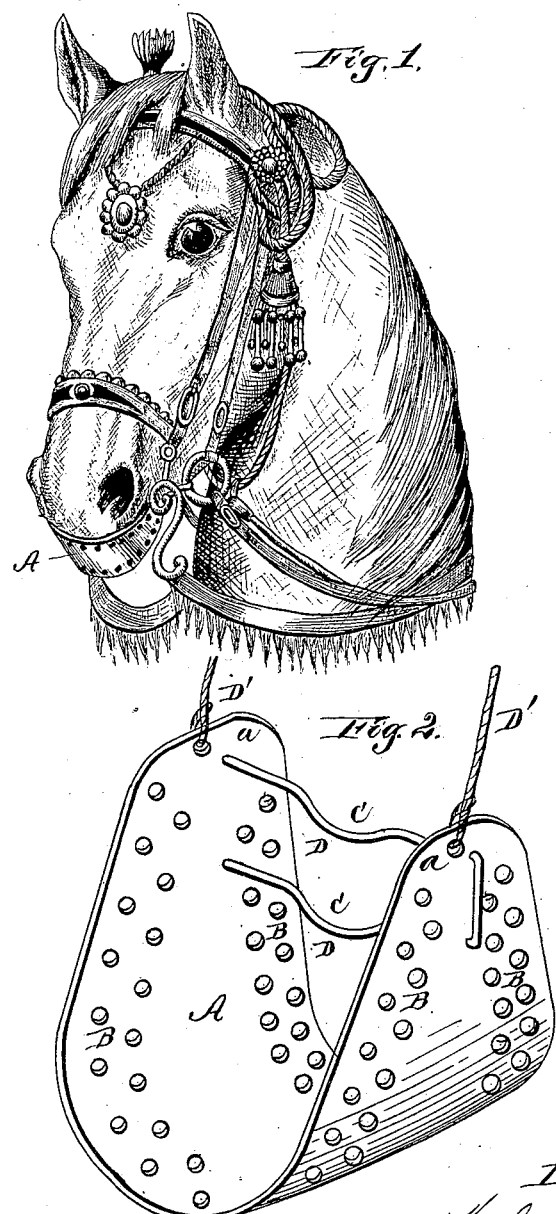

UNITED STATES PATENT OFFICE.

WILLIAM J. KERR, OF FINLEY TOWNSHIP, CHRISTIAN COUNTY, MISSOURI.

MUZZLE FOR ANIMALS.

SPECIFICATION forming part of Letters Patent No. 242,330, dated May 31, 1881.

Application filed April 21, 1881. (No model.)

*To all whom it may concern:*

Be it known that I, WILLIAM J. KERR, of Finley township, in the county of Christian and State of Missouri, have invented certain new and useful Improvements in Muzzles for Animals; and I do hereby declare that the following is a full, clear, and exact description thereof, reference being had to the accompanying drawings, and to the letters of reference marked thereon, which form part of this specification.

The object of this invention is to provide a neat, strong, light, and effective animal-muzzle, and to dispense with many of the cumbrous appliances heretofore employed in constructing articles of such nature.

To such end my invention consists, mainly, in a broad sheet-metal plate or strap, perforated or solid, and adapted to fit around the mouth of the animal, said strap being provided with one or more bits for insertion into the mouth of the animal to prevent the muzzle from slipping forward or backward, and being also provided with a suitable headstall for securing the same to the animal, all as hereinafter more fully described, and particularly pointed out in the claim.

In the drawings, Figure 1 illustrates my improved muzzle applied to the mouth of a horse, and Fig. 2 is a perspective view of the muzzle detached.

The letter A refers to a sheet-metal strap or plate that is formed or bent into the shape shown in Fig. 2, so that it will be adapted to fit over the mouth of the animal. This plate is made broad at its central portion, which is designed to form a guard over the front portion of the animal's mouth, said part being of such width that the animal cannot bite over its edges when the muzzle is applied. The plate tapers in width from its center to its ends, since the same width of muzzle will not be required at the sides of the mouth. The ends are inclined, so as to adapt the device to the animal's mouth, and the extremities are bent out or rounded to prevent injury by chafing. This muzzle-plate is provided with a series of perforations, B, which not only lighten the plate, but also permit water to flow more freely to the animal's mouth for drinking purposes. If desired, however, these perforations (which may be of any shape whatever) can be dispensed with.

C C indicate two cross-bars, which connect the two upturned ends, *a a*, of the muzzle-plate. These bars are formed with central bends, D, and not only serve as bits, but also prevent the muzzle from slipping backward or forward over the animal's mouth. They also hold the upturned ends of the muzzle-plate in rigid connection.

D' indicates the headstall, which serves to hold the muzzle up to the animal's mouth.

In forming the muzzle-plate a blank is first stamped out and then bent or struck up into shape, after which the bits will be secured thereto in any suitable manner; or the two bits or bars can be formed of one wire passed through the plate and properly secured at its ends thereto.

The muzzles can, of course, be made of various shapes and sizes to accommodate various-sized animals.

Having thus described my invention, what I claim, and desire to secure by Letters Patent, is—

In an animal-muzzle, the plate A, broad at its central portion, and having upturned ends *a a*, decreasing in width from the central portion of the plate, in combination with the cross-bars constituting bits, and the headstall, substantially as described.

In testimony that I claim the foregoing as my own I affix my signature in presence of two witnesses.

WILLIAM J. KERR.

Witnesses:
JAMES M. FORRESTER,
SAML. M. JERNIGAN.